Figure 1:
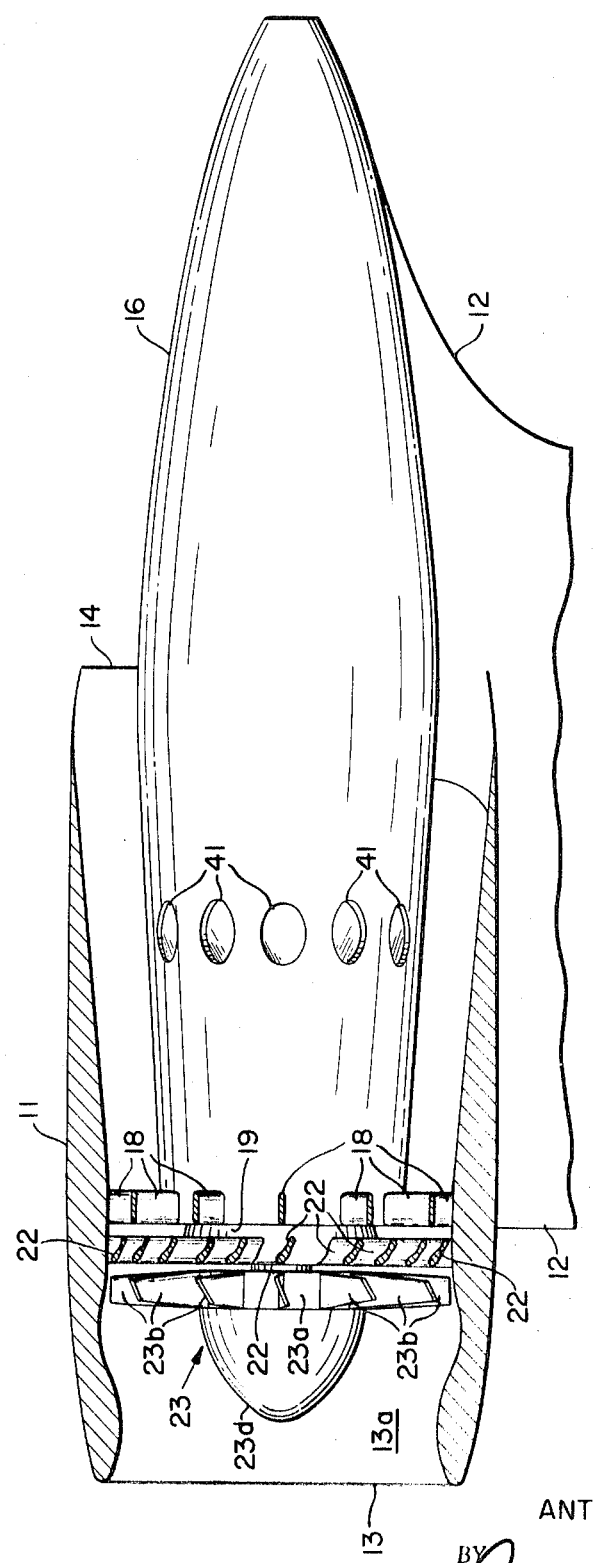

United States Patent

[11] 3,589,132

[72] Inventor Anthony A. Du Pont
 Rolling Hills, Calif.
[21] Appl. No. 830,336
[22] Filed June 4, 1969
[45] Patented June 29, 1971
[73] Assignee The Garrett Corporation
 Los Angeles, Calif.

[54] GAS TURBINE ENGINE
 19 Claims, 2 Drawing Figs.
[52] U.S. Cl. ............................................. 60/262,
 60/39.16
[51] Int. Cl. ........................................... F02k 3/06
[50] Field of Search ............................................ 60/226,
 262, 39.16, 264

[56] References Cited
 UNITED STATES PATENTS
| | | | |
|---|---|---|---|
| 2,430,399 | 11/1947 | Heppner | 60/39.16 |
| 2,477,798 | 8/1949 | Griffith | 60/39.16 |
| 2,504,181 | 4/1950 | Constant | 60/226 |
| 2,529,973 | 11/1950 | Sedille | 60/262 |
| 3,422,625 | 1/1969 | Harris | 60/262 |

FOREIGN PATENTS
419,779  4/1947  Italy .......................... 60/262

Primary Examiner—Douglas Hart
Attorneys—Edward B. Johnson, Albert J. Miller and Orville R. Seidner ABSTRACT: A gas turbine engine of the jet propulsion type wherein an intake fan on a first spool assembly draws air through an air inlet. Part of the air passes into an outer annular bypass duct and part passes through a second spool assembly compressor to be compressed to an intermediate pressure. The compressed air is ducted through a tubular duct to the aft end of the engine and turned through an angle of 180° inwardly into the inlet of a third spool assembly centrifugal compressor to be further compressed. The high-pressure air is then heated within a combustor and the combustion gases are expanded through three separate turbines that power the centrifugal compressor, the axial compressor, and the fan of the respective spool assemblies. The expanded gases are turned, approximately 125° outwardly and backwardly through an injector means into the outer annular bypass duct where they are intermixed with the air flowing therethrough. The mixture is jetted aft through a nozzle to produce forward thrust.

INVENTOR.
ANTHONY A. DUPONT
BY
Dominick Nardelli
ATTORNEY

INVENTOR.
ANTHONY A. DUPONT

ATTORNEY

GAS TURBINE ENGINE

This invention relates to gas turbine engines.

In general, to obtain maximum power from a jet engine with minimum drag, a desirable feature is to have the nacelle designed so that the ratio of the diffuser inlet area to the largest cross-sectional area of the nacelle is chosen to provide minimum nacelle drag. Therefore, axial compressors are up to now the most ideal compressors for jet engines. However, axial compressors, being staged, have the inherent drawback that the blades in each succeeding compression stage should be smaller than the blades in the previous stage, so that at very high compression ratios, the last stages would have to be made relatively small, making the latter stages difficult and expensive to fabricate.

Therefore, an object of this invention is to produce an economical gas turbine engine having a higher compression ratio than engines of the prior art.

Another object to this invention is to produce a gas turbine engine wherein the intake air is first compressed in an axial compressor and further compressed in a centrifugal compressor that is aerodynamically independent of the axial compressor.

Another object of this invention is to produce a more efficient gas turbine jet engine by increasing the compression ratio over the compression ratio of prior art engines.

Another object of this invention is to produce a gas turbine engine that can be readily started by having at least one spool with a low inertia.

Figure 2:
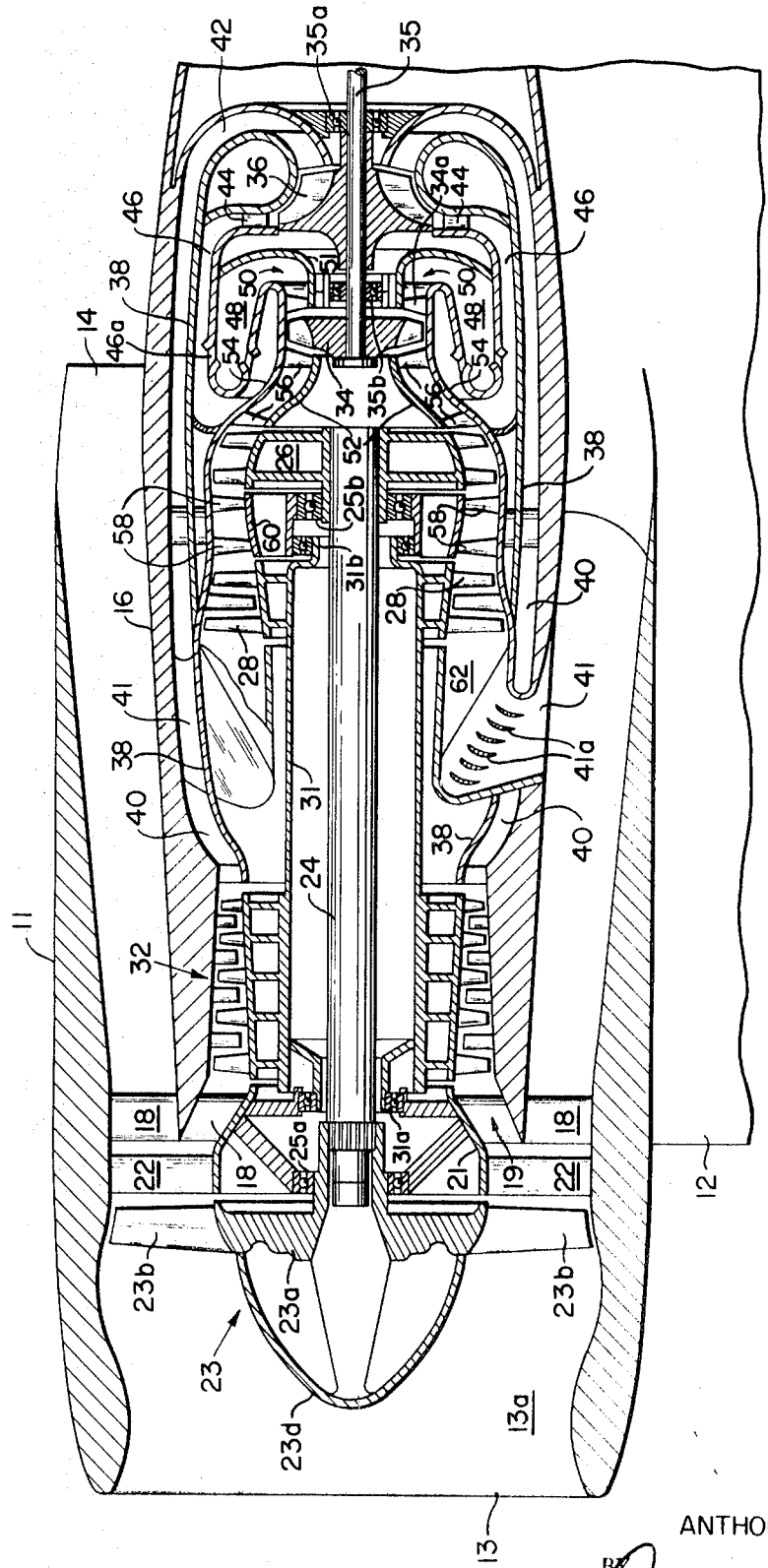

These and other objects and features or advantages of the present invention will become apparent from a review of the following specification and claims, when taken in conjunction with the drawings wherein:

FIG. 1 shows a schematic arrangement of the engine with the nacelle in cross section, and FIG. 2 is an axial section showing an enlarged schematic arrangement of the interior forward portion of the engine.

Referring to the drawings, and FIG. 1 in particular, there is shown a schematic of the novel engine, which includes a cylindrical nacelle 11 (shown in section) and is mounted to an aircraft (not shown) by a suitable streamlined strut 12 projecting radially therefrom. The nacelle 11 has a forward end 13 for intaking air into a diffuser 13a and, at the other or aft end, forms an inwardly expanding nozzle 14 with a tapered casing 16. The casing 16 is concentrically supported within the nacelle 11 also by strut 12 at its aft end and by suitably streamlined struts or vanes 18 at its forward end. Since the struts 18 are fixed to the inner surface of the nacelle 11, only broken-off stubs of some of the struts 18 are shown in FIG. 1. Between the nozzle 14 and the struts 18, exhaust ports 41 are disposed around the casing 16 for injecting the gases taken into the casing 16 at its open forward end 19, in a manner to be explained hereinafter. Within the nacelle 11, at its forward end, is located a fan 23 which draws air from the open intake end 13 and moves the air rearward through the nacelle 11.

Referring to FIG. 2, the fan has a hub 23a mounted on a rotating shaft 24. A bearing 25a suitably supports the forward end of the shaft 24 while a bearing 25b supports the aft end. On the hub 23a are disposed a plurality of radially extending fan blades 23b, while a convex cup 23d is fixed to the hub to provide suitable streamlining for the moving air stream. At the aft end of the shaft 24 is disposed a turbine 26 which will be referred to as the intermediate pressure turbine for reasons that will become apparent hereinafter.

Concentric with shaft 24 is disposed a tubular shaft 31 that is supported by a bearing 31a at its forward end and by a bearing 31b at its aft end. On the forward end of the tubular shaft 31 is disposed a multistage axial compressor 32 of standard design and located entirely within casing 16. On the aft end of the shaft 31 is disposed a low-pressure turbine 28. The low-pressure turbine is located forward of the intermediate pressure turbine 26 and, in turn, a high-pressure turbine 34 is located aft of turbine 26. High-pressure turbine 34 is disposed on the forward end of a shaft 35 that is axially aligned with and spaced from shaft 24. Shaft 35 supports a centrifugal compressor wheel 36 on its aft end. Bearings 35a and 35b suitably support shaft 35 and are mounted in a manner to be hereinafter described. When the terms first, second and third spool assemblies are hereinafter used, reference is intended respectively to exemplary assemblies comprised of fan 23, turbine 26 and shaft 24; compressor 32, turbine 28 and shaft 31; and compressor 36, turbine 34 and shaft 35.

A novel ducting arrangement is provided between the various spools elements, such as fans, compressors, turbines, etc. in order to cause the engine to deliver power. The ducting arrangement will now be described in conjunction with the operation of the engine. The engine is started by providing power to a suitable starter (not shown) to rotate shaft 35 and the associated spool compressor 36 and turbine 34, shaft 35 being adapted for connection to said starter, as for example, through means (not shown). In this engine the starter and the necessary accessories (also not shown) are located within casing 16, aft of the centrifugal compressor 36 thereby providing the interior expanding nozzle 14 and, in turn, maintaining the substantially cylindrical silhouette of the engine. When the shaft 35 is rotating at a predetermined speed to support combustion, fuel is injected into a combustor 48 and ignited. The hot gases pass through to the turbines, in a manner to be described, causing each shaft to accelerate to operating speeds. The rotating fan 23 draws air through the intake end 13 and diffuser 13a. The air then passes through stator vanes 22 whose function is to remove the spiral velocity component from the moving air. The vanes 22 are disposed between the nacelle 11 and a fairing 21. Since fairing 21 is stationary and supported also by struts 18, extending through casing 16, bearings 25a and 31a are conveniently mounted thereto. Some of the air enters casing 16 through opening 19 disposed within the annulus formed by casing 16 and the fairing 21, and the remaining air passes through the outer annulus formed between the casing 16 and the nacelle 11 to form a bypass airstream. The airstream that enters the casing 16 will be referred to as the power or working airstream since this stream powers the turbines. The ratio of bypass air to the power air may be, for example, 10 to 1 or more depending on the required engine performance. The power airstream is compressed within the axial compressor 32 of the second spool assembly and leaves the compressor 32 to enter an annular duct 40 formed between casing 16 and a tubular fairing 38. The plurality of radially extending exhaust passageways 41 extend through the ducting 40 providing support for fairing 28. Annular duct 40 continues around the three turbines 28, 26, and 34 to aft end where the ducting 40 joins an inwardly directed passageway 42 that turns the power airstream through an angle of 180° to cause the air to enter the centrifugal compressor wheel 36 of the third or high-pressure spool assembly. The compressor wheel 36 is rotating at high speed to further compress the air so that the air exiting from a diffuser 44 is at a pressure, for example, over 30 times the pressure of the air entering the fan 23, Thus, the total compression ratio for the engine is, for example, as high as 30 to 1 or more. The ducting that forms passageway 42 suitably supports bearing 35a.

Since the compressed air is now moving radially in diffuser 44, the air is turned forward 90° into toroidal-shaped compartment 46 disposed within the fairing 38. Within compartment 46 is disposed the toroidal-shaped combustor 48 with air pervious walls 46a. Combustor 48 has an annular exit port 50 directed inwardly and defined by walls 51 and 54 with wall 51 suitably supporting bearings 35b.

Since the walls of the combustor 48 are pervious to the working airstream, the compressed air passes into the combustor 48 to support combustion and is elevated in temperature as is standard in the art. The hot air or gases leave the combustion chamber 48 through exit port 50 and pass through suitable nozzles 34a to rotate the turbine wheel 34 of the third or high-pressure spool assembly. The hot gases then enter an annular duct formed by an inner fairing 52 and the outer fairing 54. Fairing 54 separates the cold compressed air in compartment 46 from the hot gases. Suitable vanes 56 support the inner fairing 52 and form nozzles for the hot gases to pass through the intermediate pressure turbine 26 of the first spool assembly. The power air stream exits into an annular duct that is formed by outer fairing 54 and an inner fairing 60. Support vanes 58 support the inner fairing 60 which, in turn, supports bearings 25b and 31b. The forward vanes 58 form suitable nozzles for the low-pressure turbine 28 of the second spool assembly and the exhaust gases exiting the turbine passes into an annular duct 62 that communicates "at its forward or terminal end" with an injector means that includes radial passageways with ports 41. Therein, the exhaust gases are bent through an angle of, for example, 125° outwardly and rearwardly with the aid of suitable vanes 41a so that exhaust gases are mixed with the bypass airstream and are directed to the aft end, both streams being jetted from the annular nozzle 14 to provide forward thrust.

Although only an exemplary embodiment of the invention is shown, various modifications and variations of the present invention are contemplated without departing from the spirit and scope of the invention. In view of the above teachings, these modifications and variations would be apparent to those skilled in the art. Therefore, the invention is not limited to the apparatus and procedures described, but includes all embodiments within the scope of the claims.

What I claim is:

1. a. outer, intermediate, and inner casings connected to provide an air inlet, a bypass fluid duct, a working fluid duct, and a fluid nozzle, a substantial portion of said working fluid duct being formed by said intermediate and inner casings, the working fluid duct turning radially inward 180° to cause part of the working fluid duct to extend forwardly to a terminal end;

b. first, second and third spool assemblies supported for rotation in said inner casing, said first spool assembly comprising an intermediate pressure turbine and a fan for directing air into said bypass and working fluid ducts, said second spool assembly comprising a low-pressure turbine and a low-pressure compressor means, said third spool assembly comprising a high-pressure turbine and a high-pressure compressor means, said third compressor means being of the centrifugal type with the inlet thereof disposed in communication with the working fluid duct at the downstream end of the 180° turn;

c. a combustor in said working fluid duct, between said high-pressure compressor means and said high-pressure turbine, said combustor burning fuel with said air to provide gases of combustion, said working fluid duct being disposed to guide said gases of combustion through said high-, intermediate-, and low-pressure turbines to rotate the respective spool assemblies; and d. injector means at the terminal end of said working fluid duct for directing the gases of combustion into said bypass fluid duct at a position downstream from the inlet of the bypass fluid duct to cause intermixing of the gases of combustion with the air in said bypass fluid duct for discharge from said fluid nozzle.

2. The engine of claim 1 wherein:
   said fan, said low-pressure compressor means, said low-pressure turbine, said intermediate pressure turbine, said high-pressure turbine, and said high-pressure compressor means are arranged in the serial order just described from front to rear of said jet engine, and
   said working fluid duct includes:
   a first annular portion formed by said intermediate and inner casings and disposed between said fan and said low-pressure compressor means for ducting working fluid to the latter,
   a second portion for ducting working fluid from said low-pressure compressor means exterior of said low-, intermediate- and high-pressure turbines, and said high-pressure compressor means to cause the working fluid to enter the latter with reversal of flow,
   a third annular portion for ducting the working fluid from said high-pressure compressor means to said combustor and then through the high- intermediate- and low-pressure turbines in turn, and
   a fourth position comprising a plurality of tubes communicating with said third annular portion and extending outwardly to communicate with said injector means.

3. An engine comprising:
   a first spool assembly disposed to rotate about an axis aligned in a forward and rearward direction,
   a second spool assembly concentric with said first axis and disposed to rotate about said axis,
   a third spool assembly spaced axially from said first and second spool assemblies and disposed to rotate about said axis,
   said first spool assembly including a fan and an intermediate pressure turbine,
   said second spool assembly including a low-pressure compressor and a low-pressure turbine,
   said third spool assembly including a high-pressure compressor and a high-pressure turbine;
   a combustor,
   a tubular casing disposed around said low- and high-pressure compressors, said turbines, and said combustor, and including duct means forming a working fluid duct,
   a nacelle disposed around and spaced from said casing to form a bypass fluid duct outside said casing which bypass fluid duct communicates with a nozzle at the rearward end,
   said nacelle being disposed to extend around said fan and form an air intake at the forward end of the nacelle so that when the fan rotates air is drawn through the intake and divided for flow into said bypass duct and said working fluid duct, and
   said working fluid duct is disposed for ducting working fluid in turn through said low-pressure compressor, said high-pressure compressor, said combustor, said turbines one by one and then ducting the working fluid from the last turbine into said bypass fluid duct to be exhausted from said nozzle.

4. The engine of claim 3 wherein:
   said fan, said low-pressure compressor, said second turbine, said first turbine, said third turbine, and said high-pressure compressor, are arranged in the serial order just described from front to rear of said engine, and
   said working fluid duct includes:
   a first annular portion disposed between said fan and said low-pressure compressor for ducting working fluid thereto,
   a second portion for ducting working fluid from said low-pressure compressor exterior of said first, second, and third turbines and said high-pressure compressor to cause the working fluid to enter the latter with reversal of flow,
   a third annular portion for ducting the working fluid from said high-pressure compressor to said combustor and then through each of the turbines in turn, and
   a fourth position comprising a plurality of tubes communicating with said third annular portion and extending outwardly to communicate with said bypass fluid duct.

5. The engine as defined in claim 3 wherein said high-pressure compressor is a centrifugal compressor.

6. The engine as defined in claim 1, wherein:
   said casing extends rearwardly of said nacelle and protrudes therefrom, and
   said casing has a tapered aft end to form said nozzle into a inwardly expanding nozzle.

7. A gas turbine engine comprising:
   at least one spool assembly having a first compressor and a first turbine disposed for rotation about the engine axis,
   an air intake at the forward end of the engine and a nozzle intermediate the ends of the engine, a combustor of the annular type for heating air moving through said engine, in combination with:

a high-pressure spool assembly spaced axially of the engine from the first mentioned spool assembly and rotating about the engine axis, said high-pressure spool assembly having a centrifugal compressor with the outlet thereof arranged to discharge directly into said combustor, and a second turbine, said second turbine being surrounded by said combustor and having the inlet of the second turbine communicating directly with the combustor outlet, said high-pressure spool assembly being adapted for operable connection with starting means for rotating said high-pressure spool assembly to start said engine.

8. In an engine:

a. inner, intermediate, and outer casings connected and arranged to provide substantially coaxial bypass fluid, compressed fluid, and hot gas ducts, the outer casing being open at the front to provide an air inlet and terminating short of the intermediate casing to form a substantially annular jet nozzle outlet, said compressed fluid duct substantially surrounding said hot gas duct and communicating at the rear end therewith by a substantially 180° return bend, the hot gas duct having outwardly directed forward portions extending through said compressed fluid duct and terminating in generally rearwardly directed ports discharging into said bypass duct upstream of said jet nozzle outlet;

b. a combustor between said return bend and said hot gas duct and discharging into the latter; and c. a plurality of spool assemblies supported in said inner casing for rotation about the axis thereof, one of said spool assemblies having a fan disposed to draw air into said inlet and direct it into said bypass and compressed fluid ducts and a turbine wheel with the blades thereof extending into said hot gas duct, another spool assembly having a compressor rotor in the inlet end of said compressed fluid duct and a turbine wheel with the blades thereof extending into the hot gas duct, and a third spool assembly having a compressor rotor disposed to receive air from said return bend and discharge it to said combustor, said third spool assembly having a turbine wheel with the blades thereof projecting into said hot gas passage adjacent the outlet of said combustor.

9. An engine as defined in claim 8 in which said compressed fluid duct substantially surrounds and is in heat exchange relationship with the combustor and the hot gas duct.

10. An engine as defined in claim 8 in which the compressor rotor of the third spool assembly is of the centrifugal type having the inlet thereof communicating with said 180° return bend and the outlet discharging to said combustor.

11. An engine as defined in claim 8 in which the third spool assembly is disposed in axial alignment with and spaced from the rear end of the first and second mentioned spool assemblies.

12. An engine as defined in claim 8 in which the second-mentioned spool assembly surrounds and is disposed intermediate the ends of part of the first-mentioned spool assembly.

13. An engine as defined in claim 8 in which the fan and compressor rotor of the first- and second-mentioned spool assemblies are spaced axially of the engine and bearing means for said spool assemblies are supported in such space by certain of said casings.

14. An engine as defined in claim 8 in which the turbines of the first- and second-mentioned spool assemblies are spaced axially of the engine and bearing means for said spool assemblies are supported in such space by certain of said casings.

15. An engine as defined in claim 13 in which the turbines of the first- and second-mentioned spool assemblies are spaced axially of the engine and bearing means for said spool assemblies are supported in such space by certain of said casings.

16. An engine as defined in claim 11 in which the third-mentioned spool assembly has bearing means supported between the compressor rotor and turbine wheel thereof by predetermined pairs of said casings.

17. An engine as defined in claim 8 in which the outer casing extends forwardly of the intermediate casing and is shaped to provide an air diffuser upstream of said fan.

18. An engine as defined in claim 17 in which the first-mentioned spool assembly is provided at the fan end with a cup-shaped spinner to assist in directly air entering said inlet to said fan.

19. An engine as defined in claim 8 in which the intermediate and outer casings converge at the rear to cause the gases issuing from the jet nozzle formed thereby to expand inwardly.

UNITED STATES PATENT OFFICE
CERTIFICATE OF CORRECTION

Patent No. 3,589,132                     Dated June 29, 1971

Inventor(s) Anthony A. Du Pont

It is certified that error appears in the above-identified patent and that said Letters Patent are hereby corrected as shown below:

Claim 1,    Insert the following introductory clause: "An engine comprising:"

Column 4,   line 7,   "position" should be -- portion --

Column 4,   line 61,  "position" should be -- portion --

Column 4,   line 66,  "1" should be -- 3 --

Column 6,   line 33,  "pairs" should be -- parts --

Column 6,   line 39,  "directly" should be -- directing --

Signed and sealed this 30th day of May 1972.

(SEAL)
Attest:

EDWARD M. FLETCHER, JR.                ROBERT GOTTSCHALK
Attesting Officer                       Commissioner of Patents